(12) United States Patent
Li et al.

(10) Patent No.: US 12,068,632 B2
(45) Date of Patent: Aug. 20, 2024

(54) CHARGING SYSTEM

(71) Applicant: Delta Electronics, Inc., Taoyuan (TW)

(72) Inventors: Sheng-Hua Li, Taoyuan (TW); Sergio Fernandez Rojas, Taoyuan (TW); You-Si Lin, Taoyuan (TW); Yu-Chi Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 32 days.

(21) Appl. No.: 18/098,062

(22) Filed: Jan. 17, 2023

(65) Prior Publication Data

US 2024/0243603 A1 Jul. 18, 2024

(51) Int. Cl.
| | |
|---|---|
| *H02J 7/04* | (2006.01) |
| *G06Q 30/0283* | (2023.01) |
| *G06Q 50/06* | (2024.01) |
| *H02J 3/00* | (2006.01) |
| *H02J 7/00* | (2006.01) |

(52) U.S. Cl.
CPC ............ *H02J 7/04* (2013.01); *G06Q 30/0283* (2013.01); *G06Q 50/06* (2013.01); *H02J 3/0012* (2020.01); *H02J 7/00032* (2020.01); *H02J 7/0013* (2013.01); *H02J 7/0048* (2020.01); *H02J 2207/20* (2020.01)

(58) Field of Classification Search
None
See application file for complete search history.

(56) References Cited

U.S. PATENT DOCUMENTS

| | | | |
|---|---|---|---|
| 2004/0130292 A1 | 7/2004 | Buchanan et al. | |
| 2015/0333637 A1 | 11/2015 | Izumi | |
| 2018/0339595 A1 | 11/2018 | Chang | |
| 2019/0009688 A1 | 1/2019 | Wu | |
| 2019/0283625 A1* | 9/2019 | Eriksson | H02J 7/0024 |

(Continued)

FOREIGN PATENT DOCUMENTS

| | | |
|---|---|---|
| CN | 206947969 U | 1/2018 |
| CN | 108146284 A | 6/2018 |

(Continued)

*Primary Examiner* — Jared Fureman
*Assistant Examiner* — Aqeel H Bukhari
(74) *Attorney, Agent, or Firm* — KIRTON McCONKIE; Evan R. Witt

(57) ABSTRACT

A charging system includes a power input part, an inverter, a DC bus, at least one charging device, a first bidirectional energy storage module, a second bidirectional energy storage module and an intelligent controller. The charging device includes a DC/DC converter and a charging gun. A first bidirectional DC/DC converter of the first bidirectional energy storage module receives and converts the DC power from the inverter for charging a first battery, or converts a first storage electric energy of the first battery for the charging device. A second bidirectional DC/DC converter of the second bidirectional energy storage module receives and converts the electric energy outputted by the DC/DC converter of the charging device for charging a second battery, or converts a second storage electric energy of the second battery for the charging device. The intelligent controller controls operations of the first bidirectional DC/DC converter and the second bidirectional DC/DC converter.

11 Claims, 1 Drawing Sheet

(56) References Cited

U.S. PATENT DOCUMENTS

| | | | |
|---|---|---|---|
| 2020/0406777 A1 | 12/2020 | Nguyen et al. | |
| 2021/0066929 A1* | 3/2021 | Suzuki | H02J 3/38 |
| 2022/0396167 A1* | 12/2022 | Sharifipour | B60L 55/00 |

FOREIGN PATENT DOCUMENTS

| | | | |
|---|---|---|---|
| CN | 110474356 A | 11/2019 | |
| CN | 111556822 A | 8/2020 | |
| CN | 112186790 A | 1/2021 | |
| CN | 112821457 A | 5/2021 | |
| CN | 112912815 A | 6/2021 | |
| CN | 113422372 A | 9/2021 | |
| CN | 113859009 A | 12/2021 | |
| CN | 214984931 U | 12/2021 | |
| EP | 2848457 A2 | 3/2015 | |
| EP | 3623200 A1 | 3/2020 | |
| JP | 2021191140 A | 12/2021 | |
| TW | 201230598 A | 7/2012 | |
| TW | 201919303 A | 5/2019 | |
| TW | 202141885 A | 11/2021 | |
| WO | 2021044955 A1 | 3/2021 | |

\* cited by examiner

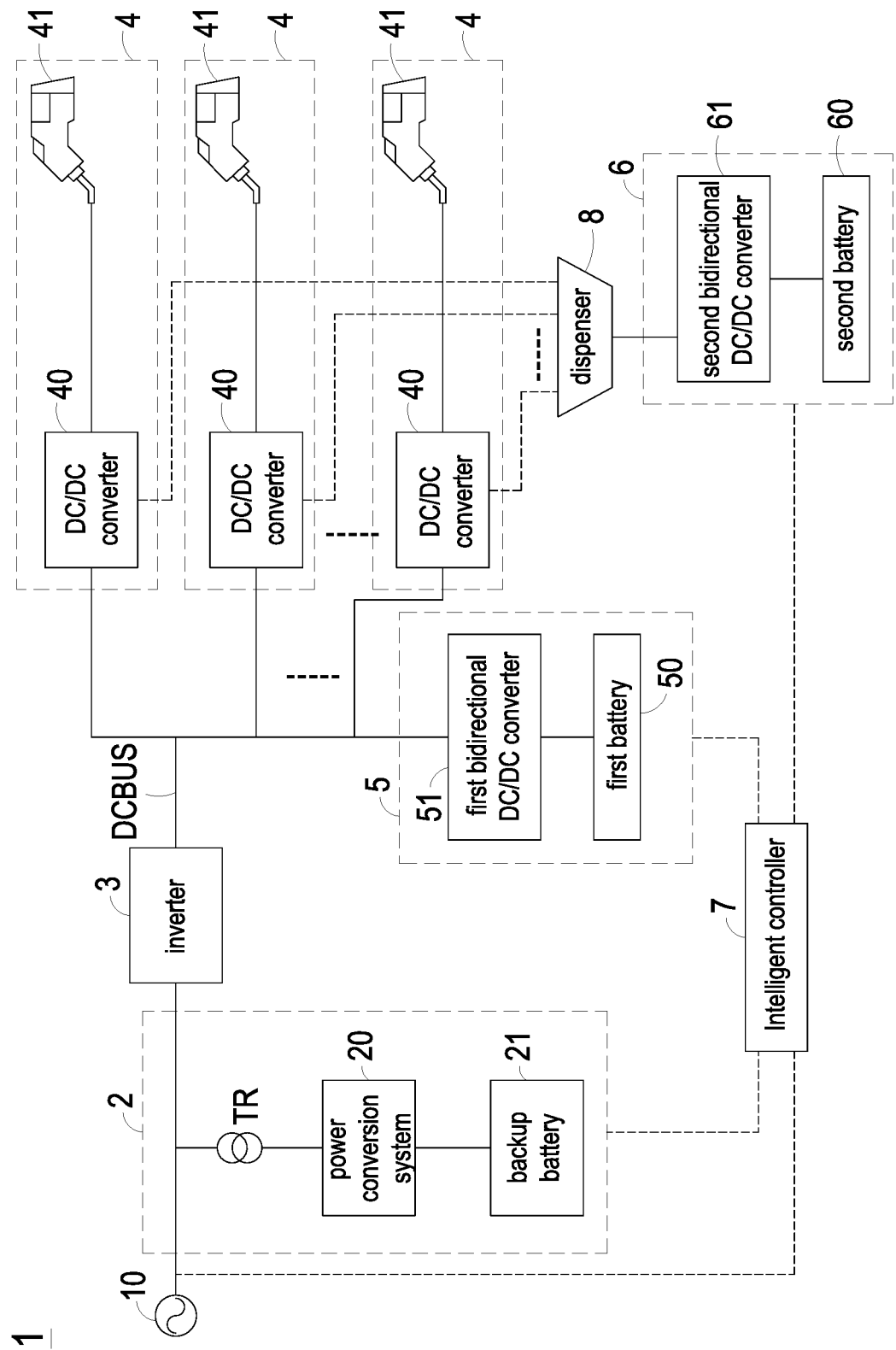

CHARGING SYSTEM

FIELD OF THE INVENTION

The present disclosure relates to a charging system, and more particularly to a charging system capable of reducing the power loss, reducing the power supply cost, and providing a high-power fast-charging function.

BACKGROUND OF THE INVENTION

Gasoline has been used as the main power source for the automobiles and motorcycles in the long term. In recent years, due to the promotion of environmental awareness and a large number of discussions on issues of limited resources, people have begun to consider about a new generation of vehicles, and electric vehicles are currently gaining more and more attention. It is hoped that the problems of environmental protection and limited resources are solved through the development of electric vehicles.

At present, the manufacturing technology of electric vehicles on the market is increasingly developed as a mature technology. Therefore, the electric vehicles bound to become the mainstream in the future. In addition, the charging system (i.e., the charging station) for providing the power source of electric vehicles has also been widely installed gradually.

However, since the conventional charging system has to provide the charging electric energy to the electric vehicle through a plurality of power stage converters, a large amount of power loss is resulted in the charging system. Furthermore, since the cost of electric energy is high, the aforementioned power loss resulted in the charging system will lead to additional power supply cost in the charging system. In addition, since the maximum charging power of the conventional charging system is limited by the grid connection installed, it fails to provide a high-power fast-charging function effectively.

Therefore, there is a need of providing a charging system capable of reducing the power loss, reducing the power supply cost, and providing a high-power fast-charging function, so as to obviate the drawbacks encountered by the prior arts.

SUMMARY OF THE INVENTION

An object of the present disclosure is to provide a charging system. In addition to a first bidirectional energy storage module, the charging system further includes a second bidirectional energy storage module, so as to use the above-mentioned bidirectional energy storage modules to achieve the advantages of reducing the power loss, reducing the power supply costs and providing the high-power fast-charging function.

In accordance with an aspect of the present disclosure, a charging system is provided. The charging system includes a power input part, an inverter, a DC bus, at least one charging device, a first bidirectional energy storage module, a second bidirectional energy storage module and an intelligent controller. The power input part is electrically connected to a power grid for outputting an AC input power. The inverter is electrically connected to the power input part for converting the AC input power into a DC power. The DC bus is electrically connected to the inverter. The at least one charging device is electrically connected to the DC bus and includes a DC/DC converter and a charging gun, wherein the DC/DC converter is electrically connected between the DC bus and the charging gun. The first bidirectional energy storage module includes a first battery and a first bidirectional DC/DC converter, wherein the first bidirectional DC/DC converter is electrically connected between the DC bus and the first battery. The first bidirectional DC/DC converter is configured to receive and convert the DC power provided by the inverter through the DC bus for charging the first battery, or convert a first storage electric energy of the first battery for delivering to the DC/DC converter of the at least one charging device through the DC bus. The second bidirectional energy storage module includes a second battery and a second bidirectional DC/DC converter, wherein the second bidirectional DC/DC converter is electrically connected between the at least one charging device and the second battery. The second bidirectional DC/DC converter is configured to receive and convert the electric energy outputted by the DC/DC converter of the at least one charging device for charging the second battery, or convert a second storage electric energy of the second battery for providing to the charging gun of the at least one charging device through the DC/DC converter corresponding thereto. The intelligent controller is electrically connected to the power input part, the first bidirectional energy storage module and the second bidirectional energy storage module, wherein the intelligent controller controls operations of the first bidirectional DC/DC converter and the second bidirectional DC/DC converter in accordance with at least one of an operation condition of the power grid, a first storage electricity value of the first battery, a second storage electricity value of the second battery, an electricity price information and a charge demand information of a load.

BRIEF DESCRIPTION OF THE DRAWINGS

The above contents of the present disclosure will become more readily apparent to those ordinarily skilled in the art after reviewing the following detailed description and accompanying drawings, in which:

FIG. 1 is a block diagram of a charging system according to an embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Please refer to FIG. 1. FIG. 1 is a block diagram of a charging system according to an embodiment of the present disclosure. As shown in FIG. 1, the charging system 1 of the present disclosure can be for example but not limited to an electric-vehicle charging station. In the embodiment, the charging system 1 includes a power input part 2, an inverter 3, a DC bus DCBUS, at least one charging device 4, a first bidirectional energy storage module 5, a second bidirectional energy storage module 6 and an intelligent controller 7.

In the embodiment, the power input part 2 is electrically connected to a power grid 10 and configured to output an AC input power. When the operation condition of the power grid 10 is normal, the AC input power outputted by the power input part 2 is provided through the power grid 10. In the embodiment, the power input part 2 includes a power conversion system (PCS) 20, a transformer device TR and a backup battery 21. The transformer device TR is electrically connected between an input terminal and an output terminal of the power input part 2. Preferably but not exclusively, the transformer device TR includes a transformer. The power conversion system 20 includes an energy storage bidirectional converter, and is electrically connected between the backup battery 21 and the transformer device TR. When the operation condition of the power grid 10 is normal, the power conversion system 20 receives and converts the electric energy provided by the power grid 10 through the transformer device TR, so as to charge the backup battery 21. When the operation condition of the power grid 10 is abnormal, for example in the even of emergency power failure, the power conversion system 20 converts the electric energy of the backup battery 21, and provides the converted electric energy to the output terminal of the power input part 2 through the transformer device TR, so that the AC input power is provided by the power input part 2 to the inverter 3.

In the embodiment, the inverter 3 is electrically connected between the output terminal of the power input part 2 and the DC bus DCBUS and configured to convert the AC input power provided by the power input part 2 into a DC power. Preferably but not exclusively, in some embodiments, the inverter 3 is a solid-state transformer (SST).

The number of the charging device 4 can be one or more than one. In the embodiment, the charging system 1 includes a plurality of charging devices 4. Each charging device 4 is electrically connected to the DC bus DCBUS. In the embodiment, the charging device 4 is configured to convert a received electric energy, for example the DC power provided by the inverter 3, to charge a load. Therefore, when the load, such as an electric vehicle, is connected to the charging device 4, the load is charged by the charging device 4. In the embodiment, each charging device 4 includes a DC/DC converter 40 and a charging gun 41. The DC/DC converter 40 is electrically connected between the DC bus DCBUS and the charging gun 41 and configured to convert the received DC power into another DC power at different voltage level, so as to provide to the charging gun 41. The charging gun 41 is electrically connected to the DC/DC converter 40. Moreover, the charging gun 41 is selectively connected to a load, and provides the DC power outputted from the DC/DC converter 40 to the load, so as to charge the load. In addition, when the controller (not shown) of the load and the charging system 1, such as the intelligent controller 7 of the charging system 1, reach an agreement (coordination) on the charging demand and the power supply capacity of the charging system 1 through communication, the charging system 1 is allowed to charge the load.

In the embodiment, the first bidirectional energy storage module 5 is electrically connected to the inverter 3 and the DC/DC converters 40 of the plurality of charging devices 4 through the DC bus DCBUS. Moreover, the first bidirectional energy storage module 5 is configured to receive the DC power provided by the inverter 3 through the DC bus DCBUS for charging, or configured to provide a first storage electric energy to the DC/DC converter 40 of the charging device 4 through the DC bus DCBUS. In some embodiments, the first bidirectional energy storage module 5 includes a first battery 50 and a first bidirectional DC/DC converter 51. The first bidirectional DC/DC converter 51 is electrically connected between the DC bus DCBUS and the first battery 50. Preferably but not exclusively, the first bidirectional DC/DC converter 51 receives and converts the DC power provided by the inverter 3 through the DC bus DCBUS for charging the first battery 50, or the first bidirectional DC/DC converter 51 converts the first storage electric energy of the first battery 50 for delivering to the DC/DC converter 40 of the at least one charging device 4 through the DC bus DCBUS.

Different from the first bidirectional energy storage module 5 directly connected to the DC bus DCBUS, in the embodiment, the second bidirectional energy storage module 6 is electrically connected to the DC/DC converter 40 of the at least one charging device 4. Moreover, the second bidirectional energy storage module 6 is configured to receive the DC electric energy outputted by the DC/DC converter 40 for charging, or configured to provide a second storage electric energy for the charging device 4. In some embodiments, the second bidirectional energy storage module 6 includes a second battery 60 and a second bidirectional DC/DC converter 61. The second bidirectional DC/DC converter 61 is electrically connected between the charging device 4 and the second battery 60. Preferably but not exclusively, the second bidirectional DC/DC converter 61 receives and converts the DC electric energy outputted by the DC/DC converter 40 of the at least one charging device 4 for charging the second battery 60, or the second bidirectional DC/DC converter 61 converts the second storage electric energy of the second battery 60 for providing to the charging gun 41 of the at least one charging device 4 through the DC/DC converter 40 corresponding thereto.

In the embodiment, the intelligent controller 7 is electrically connected to the power input part 2, the first bidirectional energy storage module 5 and the second bidirectional energy storage module 6. The intelligent controller 7 is configured to control operations of the first bidirectional DC/DC converter 51 of the first bidirectional energy storage module 5 and the second bidirectional DC/DC converter 61 of the second bidirectional energy storage module 6. Moreover, the intelligent controller 7 is configured to detect the operation condition (i.e., normal or abnormal) of the power grid 10, a first storage electricity value of the first battery 50 and a second storage electricity value of the second battery 60. In addition, the intelligent controller 7 is configured to receive an electricity price information from the power company through a wired communication transmission or a wireless communication transmission (not shown). Furthermore, the intelligent controller 7 is electrically connected to the charging gun 41. When the charging gun 41 is connected to the load, the intelligent controller 7 receives a charge demand information from the load through the charging gun 41. In the embodiment, the intelligent controller 7 controls the operations of the first bidirectional DC/DC converter 51 and the second bidirectional DC/DC converter 61 in accordance with at least one of the operation condition of the power grid 10, the first storage electricity value of the first battery 50, the second storage electricity value of the second battery 60, the electricity price information and the charge demand information of the load.

In the embodiment, when the intelligent controller 7 detects that the operation condition of the power grid 10 is normal and detects that the second storage electricity value of the second battery 60 is greater than a preset first electricity threshold value, which represents that the second battery 60 is fully charged, and the charging demand information of the load indicates that the load connected to the charging gun 41 needs to be charged in high power, the intelligent controller 7 controls the second bidirectional DC/DC converter 61 to convert the second storage electric energy of the second battery 60 at maximum power, and provides it to the charging gun 41 through the DC/DC converter 40 corresponding thereto. Meanwhile, the charging gun 41 connected with the load receives the electric energy converted from the second bidirectional DC/DC converter 61, or receives the sum of the electric energy converted form the second bidirectional DC/DC converter 61 and the electric energy converted from the DC/DC converter 40 of the charging device 4.

In the embodiment, when the intelligent controller 7 detects that the operation condition of the power grid 10 is normal and detects that the second storage electricity value of the second battery 60 is less than the first electricity threshold value and greater than a second electricity threshold value, the intelligent controller 7 controls the operation of the second bidirectional DC/DC converter 61 in accordance with the electricity price information. When the electricity price information indicates that a current electricity price is greater than a preset electricity price, the intelligent controller 7 controls the second bidirectional DC/DC converter 61 to stop the operation. In that, the DC electric energy outputted from the DC/DC converter 40 is not converted and the second battery 60 is not charged. When the electricity price information indicates that the current electricity price is less than or equal to the preset electricity price, the intelligent controller 7 controls the operation of the second bidirectional DC/DC converter 61 to convert the DC electric energy output by the DC/DC converter 40 of the at least one charging device 4, so that the second battery 60 is charged.

In the embodiment, when the intelligent controller 7 detects that the operation condition of the power grid 10 is abnormal, for example in the even of emergency power failure, the intelligent controller 7 controls the first bidirectional DC/DC converter 51 to convert the first storage electric energy of the first battery 50, and deliver to the DC/DC converter 40 of the charging device 4 through the DC bus DCBUS. Meanwhile, the intelligent controller 7 further detects whether the second storage electricity value of the second battery 60 is lower than the second electricity threshold value. When the second electricity value of the second battery 60 is greater than or equal to the second electricity threshold value, the intelligent controller 7 controls the second bidirectional DC/DC converter 61 to convert the second storage electric energy of the second battery 60, and provides it to the charging gun 41 through the DC/DC converter 40 corresponding thereto. When the second electricity value of the second battery 60 is less than the second electricity threshold value, the intelligent controller 7 controls the second bidirectional DC/DC converter 61 to stop the operation, and the second storage electric energy of the second battery 60 is not converted.

In the embodiment, when the intelligent controller 7 detects that the second electricity value of the second battery 60 is less than a preset second electricity threshold value, the intelligent controller 7 controls the second bidirectional DC/DC converter 61 to convert the DC electric energy provided by the first bidirectional DC/DC converter 51 for charging the second battery 60. Till the second electricity value of the second battery 60 is greater than or equal to the second electricity threshold value, the intelligent controller 7 controls the second bidirectional DC/DC converter 61 to stop the operation, so as to stop charging the second battery 60.

In some embodiments, the charging system 1 further includes a dispenser 8. The dispenser 8 is electrically connected to the DC/DC converters 40 of the plurality of charging devices 4, and the second bidirectional DC/DC converter 61 of the second bidirectional energy storage module 6. Preferably but not exclusively, the disperser 8 includes a switch array (not shown), and each switch in the switch array is electrically connected between the second bidirectional DC/DC convert 61 of the second bidirectional energy storage module 6 and the DC/DC converter 40 of the charging device 4 corresponding thereto. In the embodiment, each switch of the dispenser 8 is turned on or turned off under control of the intelligent controller 7. In that, the intelligent controller 7 controls the disperser 8 to select one of the DC/DC converters 40 of the plurality of charging devices 4 to conduct with the second bidirectional DC/DC converter 61 of the second bidirectional energy storage module 6, so as to provide a charging or discharging path of the second battery 60.

In some embodiments, since the second bidirectional energy storage module 6 is allowed to charge a single load at one time, the second bidirectional DC/DC converter 61 can be for example but not limited to a non-isolated converter, which includes a non-isolated circuit. Preferably but not exclusively, the isolation is ensured by the switch array of the dispenser 8. In addition, when the second battery 60 is charged, the isolation of the power grid 10 is provided by the inverter 3.

In some embodiments, the second battery 60 and the second bidirectional DC/DC converter 61 are integrated in the second bidirectional energy storage module 6. In other embodiments, the second battery 60 and the second bidirectional DC/DC converter 61 are disposed independently.

Preferably but not exclusively, in some embodiments, the capacity of the first battery 51 is greater than or equal to the capacity of the second battery 61. Preferably but not exclusively, the first battery 51 is an energy-type battery, which has high energy storage capacity. Preferably but not exclusively, the second battery 61 is a power-type battery with high power for charging and discharging.

In summary, the present disclosure provides a charging system. In addition to a first bidirectional energy storage module, the charging system further includes a second bidirectional energy storage module. When the load connected to the charging gun needs to be charged with high power, the charging system allows the second bidirectional DC/DC converter of the second bidirectional energy storage module to convert the second storage electric energy of the second battery at maximum power, and provides it to the charging gun through the DC/DC converter corresponding thereto, so that the charging system can provide high-power fast-charging function through the second bidirectional energy storage module. Moreover, the maximum charging power of the charging system is not limited by the power grid connected thereto. Furthermore, since the electric energy provided by the second bidirectional energy storage module is directly delivered to the charging gun through the DC/DC converter instead of passing through the inverter, it avoids the delivery through the multiple converters, so that the power loss of the charging system is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging system comprising:
   a power input part electrically connected to a power grid for outputting an AC input power;
   an inverter electrically connected to the power input part for converting the AC input power into a DC power;
   a DC bus electrically connected to the inverter;
   at least one charging device comprising a DC/DC converter and a charging gun, wherein the DC/DC converter is electrically connected between the DC bus and the charging gun;
   a first bidirectional energy storage module comprising a first battery and a first bidirectional DC/DC converter, wherein the first bidirectional DC/DC converter is electrically connected between the DC bus and the first battery, and the first bidirectional DC/DC converter is configured to receive and convert the DC power provided by the inverter through the DC bus for charging the first battery, or convert a first storage electric energy of the first battery for delivering to the DC/DC converter of the at least one charging device through the DC bus;

a second bidirectional energy storage module comprising a second battery and a second bidirectional DC/DC converter, wherein the second bidirectional DC/DC converter is electrically connected between the at least one charging device and the second battery, and the second bidirectional DC/DC converter is configured to receive and convert an electric energy outputted by the DC/DC converter of the at least one charging device for charging the second battery, or convert a second storage electric energy of the second battery for providing to the charging gun of the at least one charging device through the DC/DC converter corresponding thereto; and an intelligent controller electrically connected to the power input part, the first bidirectional energy storage module and the second bidirectional energy storage module.

2. The charging system according to claim 1, wherein when the intelligent controller detects that an operation condition of the power grid is normal and detects that the second storage electricity value of the second battery is greater than a first electricity threshold value, and the charging demand information of a load indicates that the load connected to the charging gun needs to be charged in high power, the intelligent controller controls the second bidirectional DC/DC converter to convert the second storage electric energy of the second battery at maximum power.

3. The charging system according to claim 1, wherein when the intelligent controller detects that the operation condition of the power grid is normal and detects that the second storage electricity value of the second battery is less than a first electricity threshold value and greater than a second electricity threshold value, the intelligent controller controls the operation of the second bidirectional DC/DC convertor in accordance with an electricity price information.

4. The charging system according to claim 3, wherein when the electricity price information indicates that a current electricity price is greater than a preset electricity price, the intelligent controller controls the second bidirectional DC/DC converter to stop the operation, wherein when the electricity price information indicates that the current electricity price is less than or equal to the preset electricity price, the intelligent controller controls the operation of the second bidirectional DC/DC converter to convert the electric energy output by the DC/DC converter of the at least one charging device for charging the second battery.

5. The charging system according to claim 1, wherein when the intelligent controller detects that the operation condition of the power grid is abnormal, the intelligent controller controls the first bidirectional DC/DC converter to convert the first storage electric energy of the first battery, and the intelligent controller further detects whether the second storage electricity value of the second battery is lower than a second electricity threshold value, wherein when the second electricity value of the second battery is greater than or equal to the second electricity threshold value, the intelligent controller controls the second bidirectional DC/DC converter to convert the second storage electric energy of the second battery, wherein when the second electricity value of the second battery is less than the second electricity threshold value, the intelligent controller controls the second bidirectional DC/DC converter to stop the operation.

6. The charging system according to claim 1, wherein when the intelligent controller detects that the second electricity value of the second battery is less than a second electricity threshold value, the intelligent controller controls the second bidirectional DC/DC converter to convert the electric energy provided by the first bidirectional DC/DC converter for charging the second battery, and till the second electricity value of the second battery is greater than or equal to the second electricity threshold value, the intelligent controller controls the second bidirectional DC/DC converter to stop the operation.

7. The charging system according to claim 1, wherein the at least one charging device includes a plurality of charging devices, and the charging system further comprises a dispenser electrically connected to the DC/DC converters of the plurality of charging devices and the second bidirectional DC/DC converter of the second bidirectional energy storage module, wherein the intelligent controller controls the dispenser to select one of the DC/DC converters of the plurality of charging devices to conduct with the second bidirectional DC/DC converter of the second bidirectional energy storage module to provide a charging or discharging path of the second battery.

8. The charging system according to claim 1, wherein the capacity of the first battery is greater than or equal to the capacity of the second battery.

9. The charging system according to claim 1, wherein the first battery is an energy-type battery, and the second battery is a power-type battery.

10. The charging system according to claim 1, wherein the second bidirectional DC/DC converter is a non-isolated converter.

11. The charging system according to claim 1, wherein the intelligent controller controls operations of the first bidirectional DC/DC converter and the second bidirectional DC/DC converter in accordance with at least one of an operation condition of the power grid, a first storage electricity value of the first battery, a second storage electricity value of the second battery, an electricity price information and a charge demand information of a load.

* * * * *